(12) United States Patent
Koch, IV (10) Patent No.: US 9,284,843 B2
(45) Date of Patent: Mar. 15, 2016

(54) BLADE SAFETY MECHANISM FOR OPEN ROTOR ENGINE SYSTEM

(71) Applicant: The Boeing Company, Chicago, IL (US)

(72) Inventor: William John Koch, IV, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 457 days.

(21) Appl. No.: 13/798,896

(22) Filed: Mar. 13, 2013

(65) Prior Publication Data

US 2014/0271179 A1 Sep. 18, 2014

(51) Int. Cl.
| | |
|---|---|
| F01D 5/14 | (2006.01) |
| F01D 21/00 | (2006.01) |
| F01B 25/16 | (2006.01) |
| B64D 27/12 | (2006.01) |
| B64D 45/00 | (2006.01) |
| B64D 27/00 | (2006.01) |

(52) U.S. Cl.
CPC .... *F01D 5/14* (2013.01); *B64D 27/12* (2013.01); *B64D 45/00* (2013.01); *B64D 2027/005* (2013.01); *Y02T 50/44* (2013.01); *Y02T 50/66* (2013.01)

(58) Field of Classification Search
CPC .......... F05D 2260/311; F05D 2260/32; F05D 2270/091; F01D 5/14; F01D 21/00; F01D 21/04; F01D 21/045; F01D 21/06; B64D 2027/005; B64D 27/12; B64D 45/00; Y02T 50/66; Y02T 50/44; F42B 3/124; F42B 3/13
USPC .................. 415/9; 416/2; 102/202.7
See application file for complete search history.

(56) References Cited

U.S. PATENT DOCUMENTS

| | | | | | |
|---|---|---|---|---|---|
| 3,208,379 | A | * | 9/1965 | McKee | F24B 3/18 102/202.1 |
| 3,340,807 | A | * | 9/1967 | Burr et al. | B64D 1/02 89/1.1 |
| 3,453,415 | A | * | 7/1969 | Hermes | B64D 15/14 219/480 |
| 3,659,527 | A | * | 5/1972 | Abegg | F24B 3/128 102/202.7 |
| 3,829,781 | A | * | 8/1974 | Letson | B64D 45/00 200/61.45 M |
| 3,912,200 | A | * | 10/1975 | Foral | B64C 27/006 244/17.11 |
| 4,345,237 | A | * | 8/1982 | Lerche | B64C 27/007 244/17.11 |
| 7,008,689 | B2 | | 3/2006 | Hawkins et al. | |
| 7,384,240 | B2 | | 6/2008 | McMillan et al. | |

(Continued)

OTHER PUBLICATIONS

"High-voltage engineers create nearly 200-foot-long electrical arcs using less energy than before (Update)," Nov. 2011, 2 pages, accessed Jan. 16, 2013, http://www.physorg.com/news/2011-11-extra-long-electrical-arcs-energy.html.

(Continued)

*Primary Examiner* — Thomas Denion
*Assistant Examiner* — Mickey France
(74) *Attorney, Agent, or Firm* — Yee & Associates, P.C.

(57) ABSTRACT

A method and apparatus for safely handling an undesired blade event in an open rotor engine system. In one illustrative embodiment, an occurrence of an undesired blade event in an open rotor engine system is detected. Electrical energy is allowed to flow into a conductor embedded in the blade in response to the undesired blade event. The conductor is vaporized when the electrical energy flowing through the conductor heats the conductor to a temperature above a selected threshold.

20 Claims, 7 Drawing Sheets

(56) References Cited

U.S. PATENT DOCUMENTS

| | | | | |
|---|---|---|---|---|
| 2005/0193715 | A1* | 9/2005 | Opper | F01D 21/003 60/39.091 |
| 2005/0238482 | A1* | 10/2005 | Loftus | B64C 27/008 415/148 |
| 2007/0048132 | A1* | 3/2007 | Boice | B64C 27/48 416/2 |
| 2010/0154435 | A1* | 6/2010 | Exley | B64C 27/82 60/792 |
| 2010/0158693 | A1* | 6/2010 | Viegas | F01D 5/282 416/223 R |

OTHER PUBLICATIONS

Hansen, "Exploding Wires: Principles, Apparatus, and Experiments," The Bell Jar, copyright 1993-2011, 13 pages.

"SBAC Aviation and Environment Briefing Papers: Open Rotor Engines," Sustainable Aviation, 8 pages, accessed Feb. 20, 2013. http://www.sustainableaviation.co.uk/wp-content/uploads/open-rotor-engine-briefing-paper.pdf.

* cited by examiner

BLADE SAFETY MECHANISM FOR OPEN ROTOR ENGINE SYSTEM

BACKGROUND INFORMATION

1. Field

The present disclosure relates generally to engine systems and, in particular, to open rotor engine systems. Still more particularly, the present disclosure relates to a safety mechanism for handling an undesired blade event in an open rotor engine system.

2. Background

An open rotor engine system is an engine system in which the propeller of the engine system is not contained within the nacelle, or housing, of the engine system. The propeller, which may be also referred to as a fan, is formed by blades connected to a hub. These blades may also be referred to as rotor blades, propeller blades, or fan blades. Rotation of a portion of the hub causes the blades to rotate about an axis through the hub.

With an open rotor engine system, the overall diameter of the propeller may be increased and the overall weight of the engine system reduced. In particular, with an open rotor engine system, the nacelle, seen typically with turbofan engines, may not be needed. Removal of the nacelle may reduce the weight of the engine system and reduce the overall drag induced by the engine system.

Depending on the configuration, an open rotor engine system may have a single propeller or a pair of propellers. The pair of propellers may include a first propeller formed by a first set of blades that rotate in one direction and a second propeller formed by a second set of blades that rotate in the opposite direction.

Prior to usage of an open rotor engine system in an aircraft, the open rotor engine system may need to be certified by one or more regulation agencies, such as, for example, the Federal Aviation Administration (FAA). Certification may require that a safety measure be in place to handle a blade release event. As used herein, a "blade release event" may be a separation of a blade from the hub of the open rotor engine system or a separation of some portion of the blade from the rest of the blade. In particular, certification of the open rotor engine system may require that a safety measure be present to prevent or reduce the possibility of a blade release event having one or more undesired effects on the aircraft and/or on another open rotor engine system of the aircraft.

Additionally, in some cases, certification may require that the aerodynamic influences and/or out-of-balance vibrations caused by a blade release event should have a limited effect on the controllability of the aircraft. Therefore, it would be desirable to have a method and apparatus that take into account at least some of the issues discussed above, as well as other possible issues.

SUMMARY

In one illustrative embodiment, an apparatus comprises a blade, a conductor embedded within the blade, and an activation system. The blade is connected to a hub in an open rotor engine system. The activation system is configured to allow electrical energy to flow into the conductor in response to an undesired blade event such that the conductor vaporizes.

In another illustrative embodiment, an open rotor engine system comprises a hub, a plurality of blades, and an activation system. A blade in the plurality of blades comprises a conductor embedded within the blade. The activation system is configured to allow electrical energy to flow into the conductor in response to an undesired blade event such that the conductor vaporizes and the blade at least one of delaminates or fragments.

In yet another illustrative embodiment, a method is provided for handling an undesired blade event. An occurrence of an undesired blade event in an open rotor engine system is detected. Electrical energy is allowed to flow into a conductor embedded in the blade in response to detection of the undesired blade event. The conductor is vaporized when the electrical energy flowing through the conductor heats the conductor to a temperature above a selected threshold.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that one method for handling a blade release event may involve positioning an open rotor engine system at a location along an aircraft in which any undesired effects of the blade release may be minimized. However, the illustrative embodiments recognize and take into account that the locations along the aircraft at which the open rotor engine system may be positioned may be limited by the size of the aircraft, a desired center of mass location for the aircraft, a desired level of aerodynamic performance for the aircraft, and/or other types of factors.

Another method for handling a blade release event may include adding shielding to portions of the aircraft that may be affected by the blade release. For example, shielding may be added to the portion of a fuselage that may be impacted by a blade that has separated from the hub of the open rotor engine system. However, the illustrative embodiments also recognize and take into account this type of shielding may increase the weight of the aircraft more than desired. Additionally, in some cases, the shielding may affect the aerodynamic performance of the aircraft.

Thus, the illustrative embodiments described below provide a blade safety mechanism that may be used to safely handle blade release events and/or other types of undesired blade events. The blade safety mechanism described in the figures below may not increase the weight of the aircraft beyond selected tolerances. Further, this blade safety mechanism may not affect the aerodynamic performance of the aircraft outside of selected tolerances.

Figure 1:
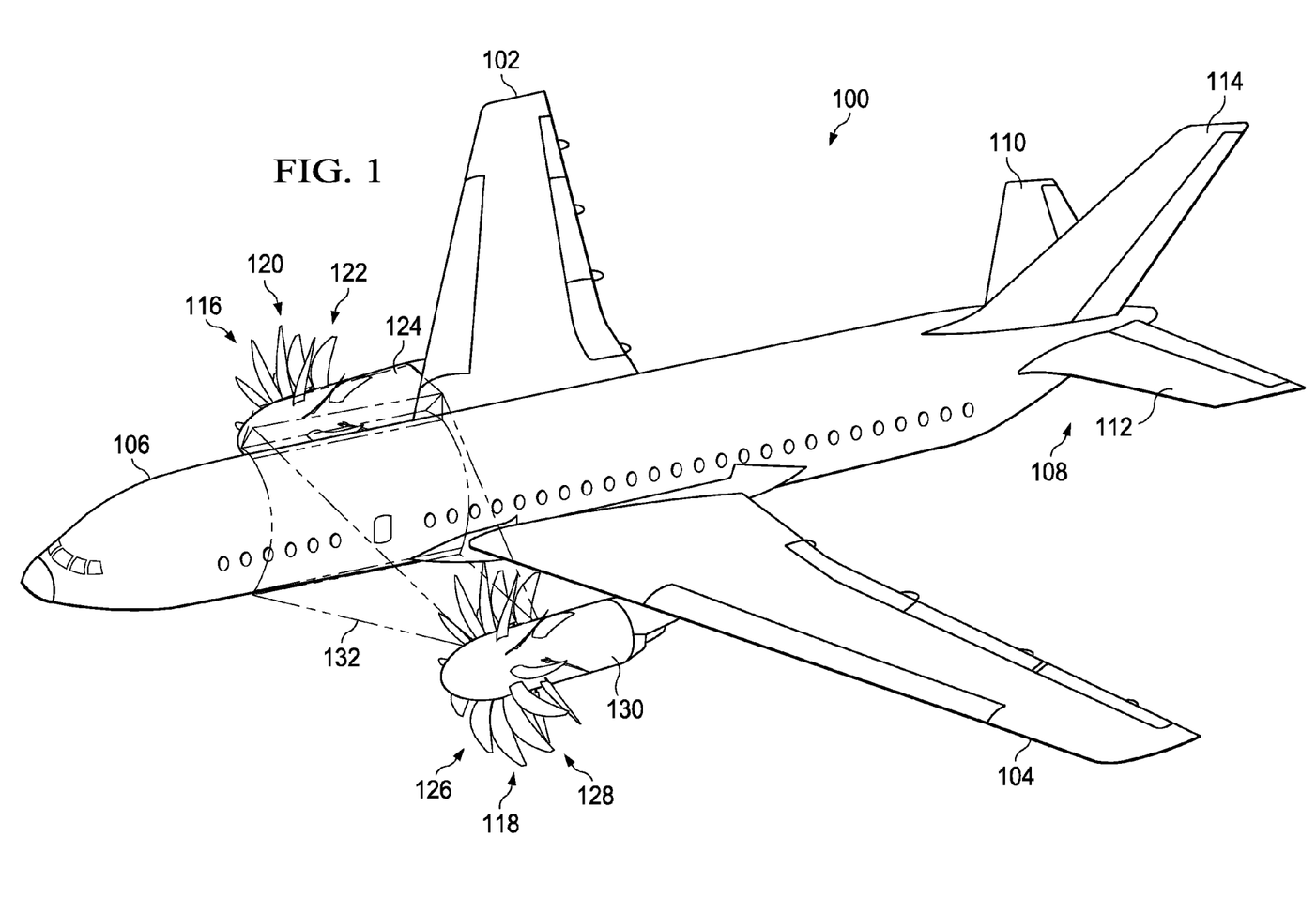
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this illustrative example, aircraft 100 has wing 102 and wing 104 attached to body 106. Body 106 of aircraft 100 has tail section 108. Horizontal stabilizer 110, horizontal stabilizer 112, and vertical stabilizer 114 are attached to tail section 108 of body 106.

As depicted, aircraft 100 includes open rotor engine system 116 attached to wing 102 and open rotor engine system 118 attached to wing 104. Open rotor engine system 116 includes propeller 120 and propeller 122, which are both associated with nacelle 124. Open rotor engine system 118 includes propeller 126 and propeller 128, which are both associated with nacelle 130.

As used herein, when one component is "associated" with another component, the association is a physical association in the depicted examples. For example, a first component, such as propeller 120, may be considered to be associated with a second component, such as nacelle 124, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Open rotor engine system 116 and open rotor engine system 118 both have blade safety mechanisms configured to handle blade release events. Area 132 indicates the area around body 106 of aircraft 100 into which a blade may enter once the blade has separated from a hub inside the nacelle of the corresponding open rotor engine system. The blade safety mechanisms cause disintegration of at least one blade in response to any undesired blade event that occurs with a particular blade such that the particular blade is prevented from impacting body 106 of aircraft 100 within area 132 or, in some cases, outside area 132.

Figure 2:
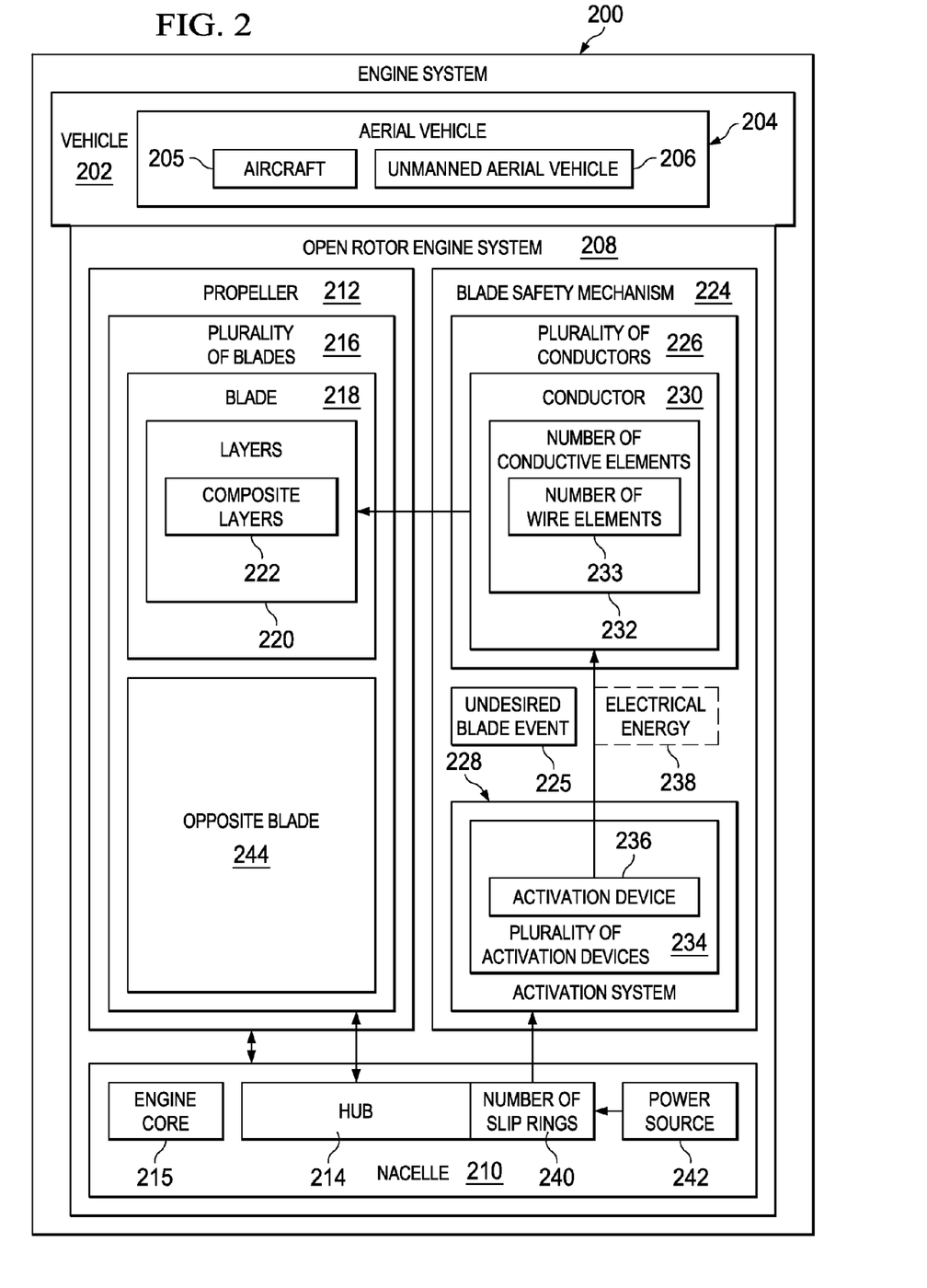
FIG. 2 is an illustration of an engine system in the form of a block diagram in accordance with an illustrative embodiment.

With reference now to FIG. 2, an illustration of an engine system is depicted in the form of a block diagram in accordance with an illustrative embodiment. Engine system 200 may be used to move vehicle 202. Vehicle 202 may be any platform configured to move. In one illustrative example, vehicle 202 takes the form of aerial vehicle 204. Aerial vehicle 204 may take the form of, for example, without limitation, aircraft 205, unmanned aerial vehicle 206, or some other type of air-based vehicle. Aircraft 100 in FIG. 1 may be an example of one implementation for aircraft 205 in FIG. 2.

In this illustrative example, engine system 200 takes the form of open rotor engine system 208. Open rotor engine system 116 and open rotor engine system 118 in FIG. 1 are examples of implementations for open rotor engine system 208 in FIG. 2.

As depicted, open rotor engine system 208 may include nacelle 210, propeller 212, hub 214, and engine core 215. Propeller 212 is located outside of nacelle 210. Hub 214 and engine core 215 are located within nacelle 210. Propeller 212 may be associated with nacelle 210 by being connected to hub 214. In this illustrative example, open rotor engine system 208 includes only one propeller. However, in other illustrative examples, open rotor engine system 208 may include more than one propeller. Propellers 120, 122, 126, and 128 in FIG. 1 are examples of implementations for propeller 212 in FIG. 2.

Propeller 212 is formed by plurality of blades 216. Blade 218 is an example of one of plurality of blades 216. As depicted, blade 218 is comprised of layers 220. In one illustrative example, layers 220 may take the form of composite layers 222. Each of composite layers 222 may be comprised of one or more composite materials. As one illustrative example, each of composite layers 222 may be a layer of a carbon fiber. These layers of carbon fiber may have been cured to form a solid carbon fiber blade. Composite layers 222 may also be referred to as composite plies.

Open rotor engine system 208 also includes blade safety mechanism 224. Blade safety mechanism 224 is configured to handle undesired blade event 225. Undesired blade event 225 may comprise at least one of a separation of one of plurality of blades 216 from hub 214, a bifurcation of one of plurality of blades 216 along a length of the blade, a separation of some portion of a segment of a blade from the rest of the blade, or some other type of undesired blade event. In this manner, blade safety mechanism 224 is configured to safely handle blade release events and other types of undesired blade events.

As depicted, blade safety mechanism 224 includes plurality of conductors 226 and activation system 228. Conductor 230 is an example of one of plurality of conductors 226. Conductor 230 may be comprised of number of conductive elements 232. As used herein, a "number of" items may include one or more items. In this manner, number of conductive elements 232 may include one or more conductive elements.

A "conductive element," as used herein, such as one of number of conductive elements 232, may be an object or piece of material that allows the flow of electric charges in one or more directions. In other words, a conductive element may be an element that allows electricity to pass through the element. In this illustrative example, number of conductive elements 232 may include at least one of a conductive wire, a conductive thread, a conductive filament, a conductive fiber, a conductive patch of material, a conductive mesh, or some other type of conductive object or piece of material.

As used herein, the phrase "at least one of," when used with a list of items, means different combinations of one or more of the listed items may be used but only one item in the list of items may be needed. The item may be a particular object, thing, or category. In other words, "at least one of" means that any combination of items and any number of items may be used from the list but not all of the items in the list are required.

For example, "at least one of item A, item B, or item C" may include, without limitation, item A, item A and item B, or only item B. For example, "at least one of item A, item B, or item C" may include, without limitation, item A; both item A and item B; item A, item B, and item C; or item B and item C. In other examples, "at least one of" may be, for example, without limitation, two of item A, one of item B, and ten of item C; four of item B and seven of item C; or some other type of combination.

In one illustrative example, number of conductive elements 232 may be implemented using number of wire elements 233. Number of wire elements 233 may be one or more metallic wires such as, for example, without limitation, one or more copper wires.

Conductor 230 may be embedded within blade 218 in this illustrative example. In one illustrative example, conductor 230 may be embedded between layers 220 of blade 218. In this example, conductor 230 may not be exposed on the outer surface of blade 218. However, in other illustrative examples, some portion of conductor 230 may be exposed on the outer surface of blade 218.

When layers 220 takes the form of composite layers 222, number of conductive elements 232 may be arranged at least one of substantially parallel to the fibers running through composite layers 222 or substantially orthogonal to the fibers running through composite layers 222. In one illustrative example, number of conductive elements 232 may traverse blade 218 in a chord-wise direction so that number of conductive elements 232 may be unaffected by span-wise strain within blade 218.

In some cases, number of conductive elements 232 may be implemented using a single wire that is wound around a portion of layers 220 of blade 218. This wire may be wound around blade 218 in a spiral of, for example, about 5 degrees to about 20 degrees.

Conductor 230 is electrically connected to activation system 228. As used herein, when a first component, such as conductor 230, is "electrically connected" to a second component, such as activation system 228, the first component is connected to the second component such that an electrical current, or electrical energy, may flow from the first component to the second component, from the second component to the first component, or a combination of the two. In some cases, the first component may be electrically connected to the second component without any additional components between the two components. In other cases, the first component may be electrically connected to the second component by one or more other components.

When more than one conductive element is used to form conductor 230, these conductive elements may be electrically connected to each other with at least one of the conductive elements being electrically connected to activation system 228. However, in some cases, at least a portion of these conductive elements may not be electrically connected to each other and may be independently electrically connected to activation system 228.

As depicted, activation system 228 may include plurality of activation devices 234. In one illustrative example, each of plurality of activation devices 234 may be electrically connected to a corresponding one of plurality of conductors 226. For example, activation device 236 in plurality of activation devices 234 may be electrically connected to conductor 230.

Activation device 236 activates a safety measure in response to the occurrence of undesired blade event 225. As one illustrative example, this safety measure may be activated in response to a partial separation or complete separation of blade 218, in whole or in part, from hub 214. Activation device 236 may detect undesired blade event 225 and allow electrical energy 238 to flow into conductor 230 in response to undesired blade event 225. The flow of electrical energy 238 into and through conductor 230 heats conductor 230 to a temperature above a selected threshold such that conductor 230 vaporizes.

As used herein, when an object "vaporizes," the object is converted into one or more gases, with both thermal energy and a shock wave being released. These molecules of the one or more gases may be ionized such that hot plasma is formed. In this illustrative example, when conductor 230 "vaporizes," conductor 230 is converted into plasma, thereby releasing thermal energy and a shock wave that is experienced within blade 218.

The release of thermal energy and the shock wave within blade 218 causes blade 218 to at least one or portion of one delaminate or fragment. When blade 218 "delaminates," layers 220 in blade 218 may divide or separate from each other. When blade 218 "fragments," blade 218 is broken up into smaller portions. In some cases, the delamination and/or fragmentation of blade 218 may be referred to as the disintegration of blade 218.

In one illustrative example, plurality of activation devices 234 may be located on the rotating portion of hub 214. In this example, number of slip rings 240 may be used to transfer electrical energy generated by power source 242 within nacelle 210 to plurality of activation devices 234.

In some cases, the activation of the safety measure for blade 218 by activation device 236 may cause the activation of a similar safety measure for opposite blade 244. Opposite blade 244 may be the blade located directly opposite of blade 218 with respect to a center axis through hub 214.

For example, the release of electrical energy 238 into conductor 230 by activation device 236 may trigger a blade event for opposite blade 244. This blade event may be, for example, the separation of opposite blade 244 from hub 214. Separation of opposite blade 244 from hub 214 may result in the activation device in plurality of activation devices 234 corresponding to opposite blade 244 releasing electrical energy into the conductor in plurality of conductors 226 embedded within opposite blade 244. In this manner, opposite blade 244 may be at least one of delaminated or fragmented. This process may reduce the out-of-balance vibration caused by blade 218 separating from hub 214. Reducing this out-of-balance vibration may reduce and/or prevent the possibility of undesired structural effects on aircraft 205 and/or the loss of control of aircraft 205.

Figure 3:
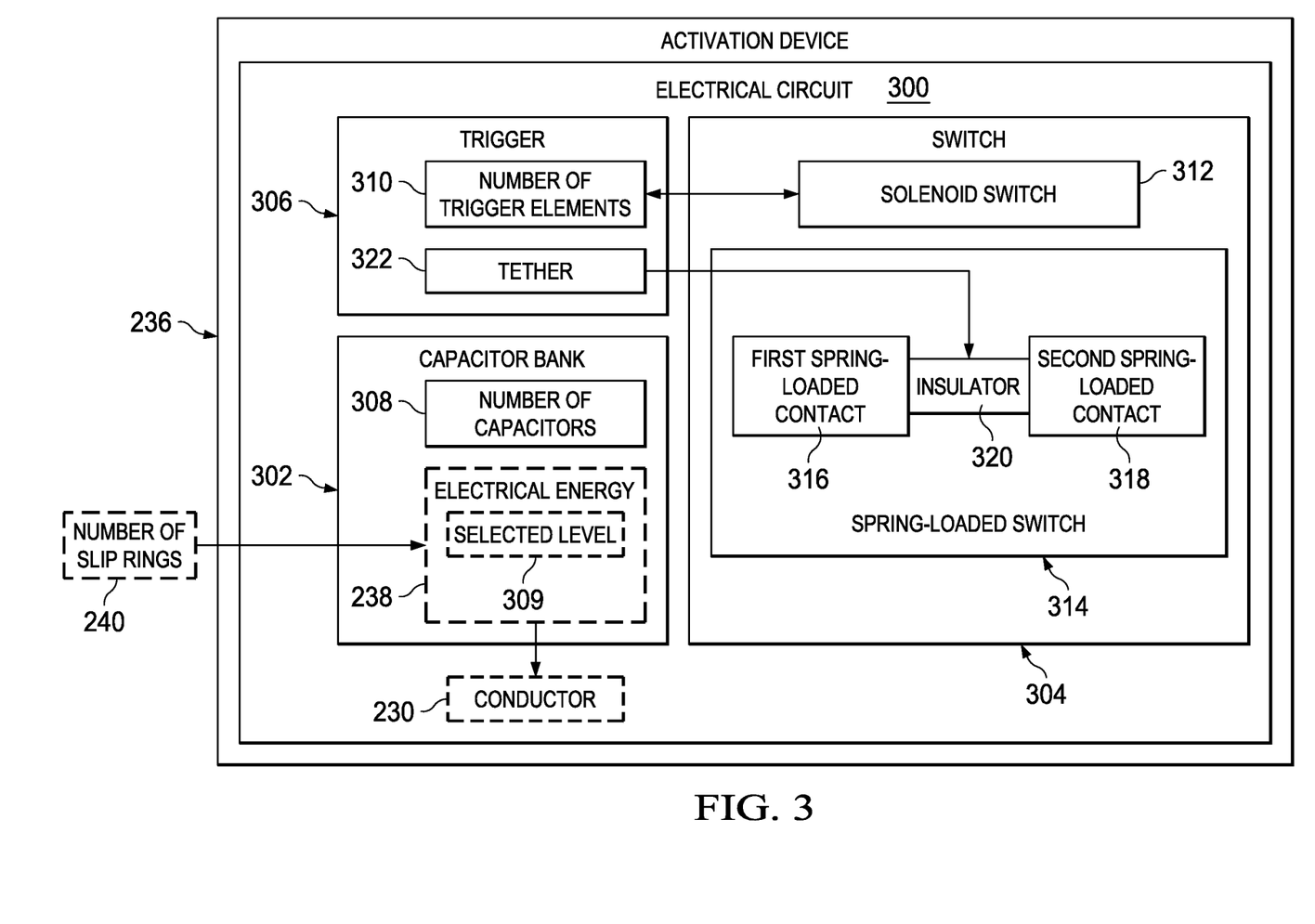
FIG. 3 is an illustration of an activation device in the form of a block diagram in accordance with an illustrative embodiment.

With reference now to FIG. 3, an illustration of activation device 236 from FIG. 2 is depicted in the form of a block diagram in accordance with an illustrative embodiment. In one illustrative example, activation device 236 is implemented using electrical circuit 300. Electrical circuit 300 may include capacitor bank 302, switch 304, and trigger 306. In some cases, conductor 230 may be considered part of electrical circuit 300.

As depicted, capacitor bank 302 may be formed using number of capacitors 308. Number of capacitors 308 may be electrically connected to conductor 230 such that electrical energy 238 stored within number of capacitors 308 may be sent into conductor 230.

Capacitor bank 302 may be charged using, for example, without limitation, number of slip rings 240, to increase electrical energy 238 stored within capacitor bank 302. For example, number of slip rings 240 may send a current into capacitor bank 302 to charge capacitor bank 302. Capacitor bank 302 may be charged until at least selected level 309 of electrical energy 238 has been reached. Selected level 309 may be the level of electrical energy 238 needed to be sent into conductor 230 in FIG. 2 in order to cause vaporization of conductor 230.

When blade 218 is connected to hub 214 in FIG. 2, switch 304 is open. When switch 304 is open, electrical circuit 300 is open and electrical energy 238 is prevented from being sent into conductor 230. However, when switch 304 is closed, electrical circuit 300 is closed and capacitor bank 302 may discharge electrical energy 238 into conductor 230. Switch 304 is controlled using trigger 306. In this manner, trigger 306 is used to initiate the release of electrical energy 238 into conductor 230. In particular, trigger 306 is used to detect undesired blade event 225 in FIG. 2 and close switch 304 in response to a detection of undesired blade event 225 occurring.

Trigger 306 and switch 304 are configured such that electrical circuit 300 is closed quickly enough to allow selected level 309 of electrical energy 238 to be discharged from capacitor bank 302 into conductor 230 before the electrical connection between capacitor bank 302 and conductor 230 is severed.

In one illustrative example, trigger 306 is implemented using number of trigger elements 310. Number of trigger elements 310 may be connected to at least one of blade 218 and hub 214. Number of trigger elements 310 may be, for example, a number of trigger wires. When blade 218 is connected to hub 214, number of trigger elements 310 remains intact. When blade 218 separates from hub 214, number of trigger elements 310 breaks. The breaking of number of trigger elements 310 causes switch 304 to close.

For example, number of trigger elements 310 may be implemented as a single, brittle wire located on the outer surface of blade 218 and connected to switch 304. This wire may be placed along the length of the blade 218 such that the wire traverses from the base of blade 218 to the tip of blade 218, returning several times such that the wire covers the entire perimeter of blade 218. Of course, depending on the implementation, the wire may be arranged along blade 218 in some other manner. The wire may be selected such that the brittleness of the wire causes the wire to break just above the threshold for the occurrence of undesired blade event 225.

As one illustrative example, the separation of blade 218 from hub 214 or the separation of a portion of blade 218 from the rest of blade 218 may cause undesired effects within blade 218. The brittle wire may be configured to respond to these undesired effects and break when the threshold for these undesired effects has been reached.

Switch 304 may be implemented in a number of different ways. In one illustrative example, switch 304 takes the form of solenoid switch 312. The breaking of number of trigger elements 310 may remove the electrical current being supplied to solenoid switch 312, thereby causing solenoid switch 312 to close. The closing of solenoid switch 312 may then, in turn, cause electrical current to flow into conductor 230 embedded within blade 218.

In another illustrative example, switch 304 takes the form of spring-loaded switch 314. Spring-loaded switch 314 includes first spring-loaded contact 316, second spring-loaded contact 318, and insulator 320. First spring-loaded contact 316 and second spring-loaded contact 318 are biased towards each other. However, insulator 320 is located between first spring-loaded contact 316 and second spring-loaded contact 318. In particular, insulator 320 is used to separate first spring-loaded contact 316 and second spring-loaded contact 318.

Insulator 320 may be implemented using any object or piece of material configured to block the flow of electrical current between first spring-loaded contact 316 and second spring-loaded contact 318. In one illustrative example, insulator 320 takes the form of a ceramic block.

When switch 304 takes the form of spring-loaded switch 314, trigger 306 may be implemented using tether 322. Tether 322 may be connected to insulator 320. Tether 322 is configured to move insulator 320 such that insulator 320 no longer separates first spring-loaded contact 316 and second spring-loaded contact 318. In this manner, first spring-loaded contact 316 may be allowed to contact second spring-loaded contact 318, thereby closing electrical circuit 300 and causing electrical current to flow into conductor 230 embedded within blade 218.

The illustrations of vehicle 202 and open rotor engine system 208 in FIG. 2 and activation device 236 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, blade safety mechanism 224 in FIG. 2 may be used to safely handle undesired blade events occurring with one or more other propellers of open rotor engine system 208 in addition to propeller 212 in FIG. 2. In other illustrative examples, number of slip rings 240 may not be needed to supply electrical energy to activation system 228 in FIG. 2.

In some illustrative examples, some other type of switch 304 may be used. For example, switch 304 may be implemented using a plasma switch in some cases. In still other illustrative examples, a stationary contact may be used in the place of second spring-loaded contact 318 or first spring-loaded contact 316.

Figures 4, 5:
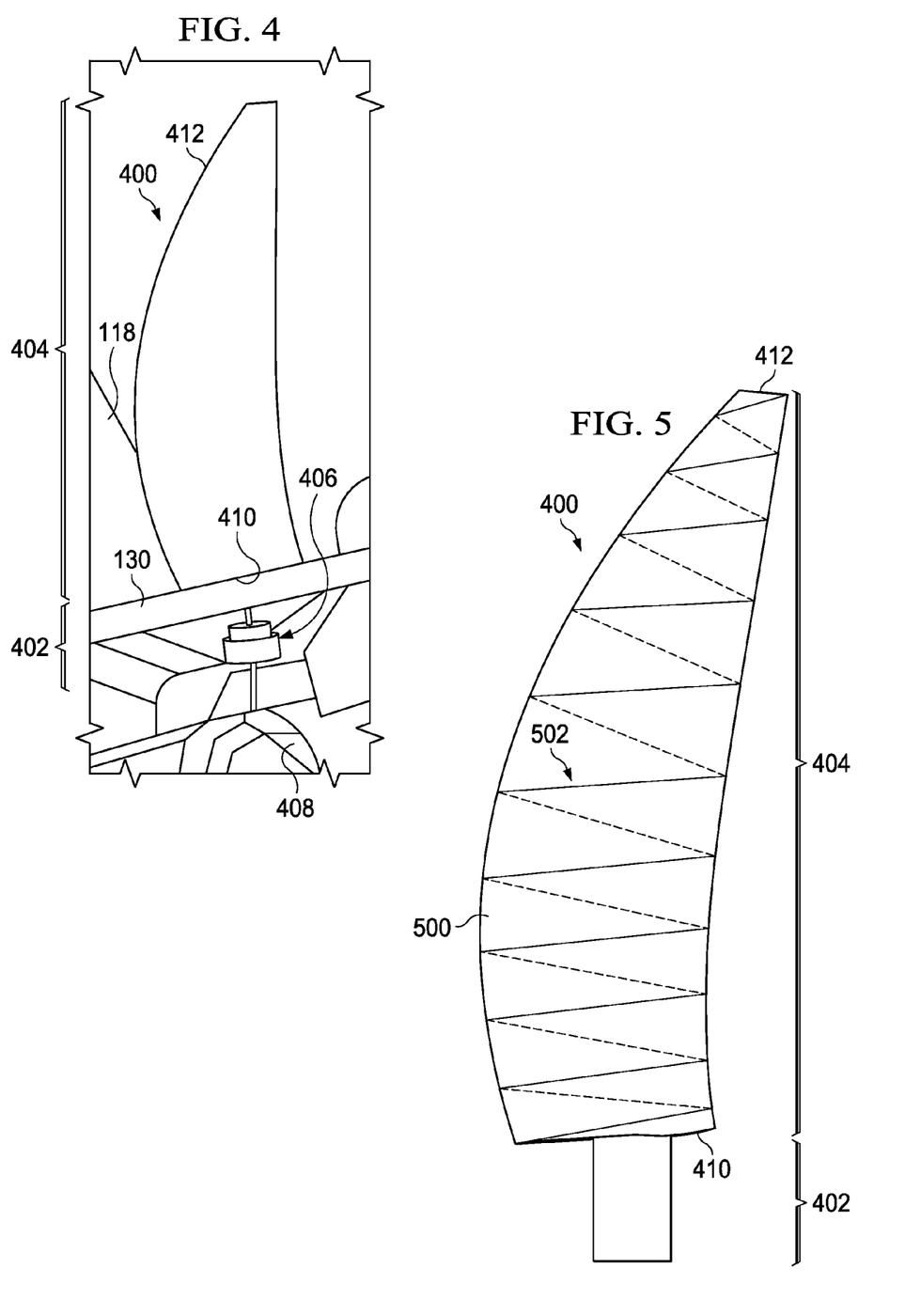
FIG. 4 is an illustration of an enlarged view of a blade in accordance with an illustrative embodiment.
FIG. 5 is an illustration of a blade in accordance with an illustrative embodiment.

With reference now to FIG. 4, an illustration of an enlarged view of a blade is depicted in accordance with an illustrative embodiment. Blade 400 in FIG. 4 may be one of the blades that forms propeller 128 in FIG. 1. In this illustrative example, blade 400 has root section 402 and airfoil section 404.

As depicted, root section 402 of blade 400 is located within nacelle 130 of open rotor engine system 118 but airfoil section 404 of blade 400 extends outside of nacelle 130. Root section 402 includes attachment unit 406 that is used to attach root section 402 of blade 400 to hub 408. Airfoil section 404 has base 410 and tip 412.

With reference now to FIG. 5, an illustration of blade 400 from FIG. 4 is depicted in accordance with an illustrative embodiment. In FIG. 5, one or more of the outermost layers used to form blade 400 have been removed such that conductor 500 around inner layers 502 of blade 400 may be more clearly seen. In this illustrative example, conductor 500 is a wire that has been wound around inner layers 502 of blade 400.

Figure 6:
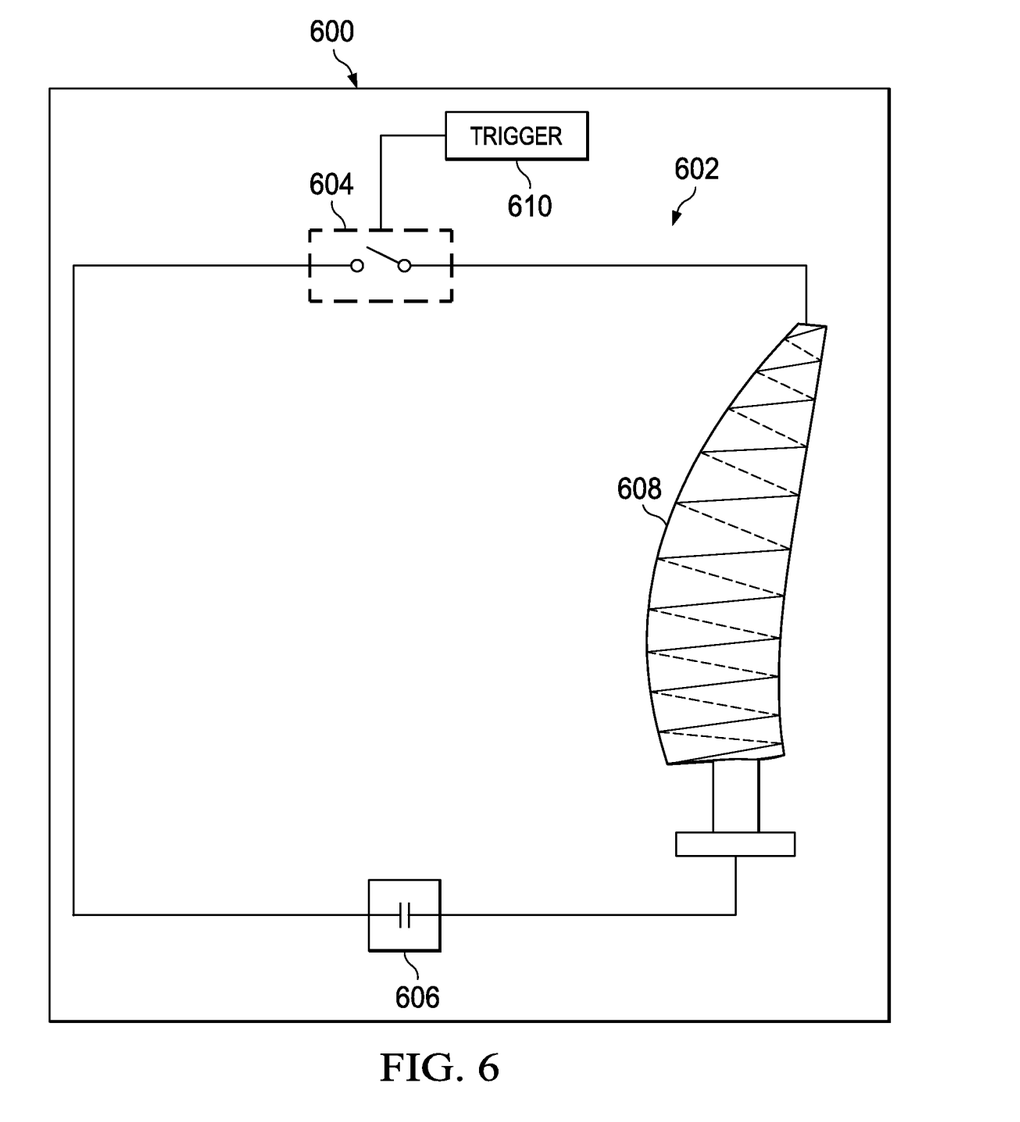
FIG. 6 is an illustration of a schematic representation of an activation device in accordance with an illustrative embodiment.

Turning now to FIG. 6, an illustration of a schematic representation of an activation device is depicted in accordance with an illustrative embodiment. In FIG. 6, activation device 600 is an example of one implementation for activation device 236 in FIGS. 2-3. In this illustrative example, activation device 236 is implemented using electrical circuit 602. Electrical circuit 602 is an example of one implementation for electrical circuit 300 in FIG. 3.

As depicted, electrical circuit 602 includes switch 604, capacitor bank 606, conductor 608, and trigger 610. Trigger 610 is configured to control switch 604. Trigger 610 closes switch 604 in response to an undesired blade event. When switch 604 closes, electrical circuit 602 is then closed and at least a portion of the electrical energy stored in capacitor bank 606 is allowed to flow into conductor 608. When switch 604 is open, electrical energy is not allowed to flow into conductor 608.

The illustrations of blade 400 in FIGS. 4-5 and activation device 600 in FIG. 6 are not meant to imply physical or architectural limitations to the manner in which an illustrative embodiment may be implemented. Other components in addition to or in place of the ones illustrated may be used. Some components may be optional.

The different components shown in FIGS. 4-6 may be illustrative examples of how components shown in block form in FIGS. 2-3 can be implemented as physical structures. Additionally, some of the components in FIGS. 4-6 may be combined with components in FIGS. 2-3, used with components in FIGS. 2-3, or a combination of the two.

Figure 7:
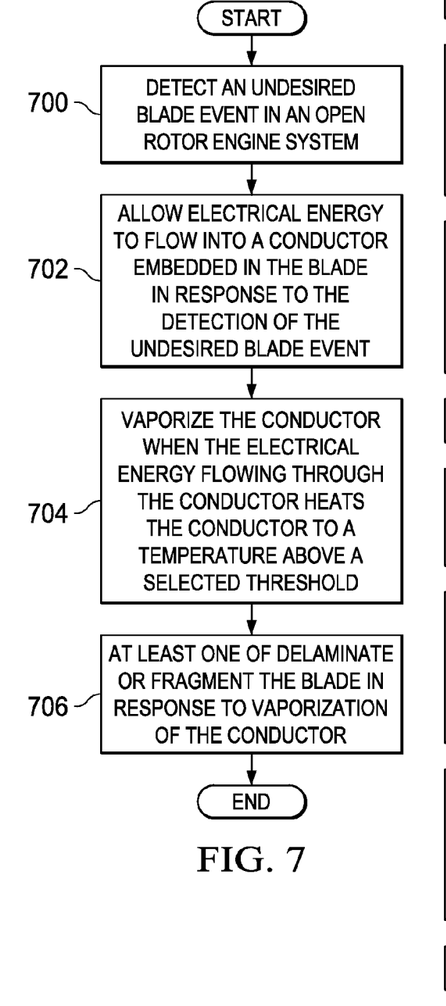
FIG. 7 is an illustration of a process for handling an undesired blade event in the form of a flowchart in accordance with an illustrative embodiment.

With reference now to FIG. 7, an illustration of a process for handling an undesired blade event is depicted in the form of a flowchart in accordance with an illustrative embodiment. The process illustrated in FIG. 7 may be performed using a blade safety mechanism such as, for example, without limitation, blade safety mechanism 224 in FIG. 2.

The process begins by detecting an undesired blade event in an open rotor engine system (operation 700). Next, electrical energy is allowed to flow into a conductor embedded in the blade in response to detection of the undesired blade event (operation 702). The conductor may be comprised of, for example, one or more metallic wires.

The conductor is vaporized when the electrical energy flowing through the conductor heats the conductor to a temperature above a selected threshold (operation 704). When operation 704 is performed, the vaporization of the conductor results in a release of thermal energy and a shock wave within the blade. The blade at least one of delaminates or fragments in response to vaporization of the conductor (operation 706), with the process terminating thereafter.

Figure 8:
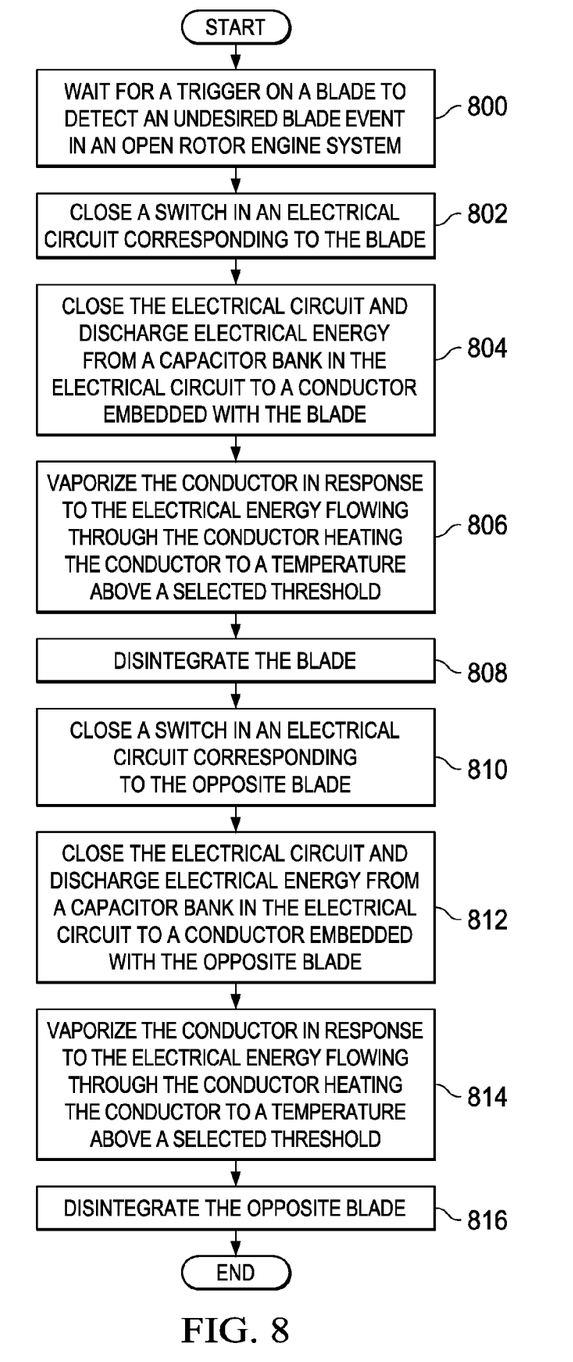
FIG. 8 is an illustration of a process for handling an undesired blade event in the form of a flowchart in accordance with an illustrative embodiment.

With reference now to FIG. 8, an illustration of a process for handling an undesired blade event is depicted in the form of a flowchart in accordance with an illustrative embodiment. The process described in FIG. 8 may be a more detailed version of the process described in FIG. 7.

The process begins by waiting for a trigger on a blade to detect an undesired blade event in an open rotor engine system (operation 800). In response to the trigger detecting the undesired blade event, the trigger closes a switch in an electrical circuit corresponding to the blade (operation 802). In response to the switch closing, the electrical circuit is closed and electrical energy is discharged from a capacitor bank in the electrical circuit to a conductor embedded with the blade (operation 804).

The conductor is vaporized in response to the electrical energy flowing through the conductor heating the conductor to a temperature above a selected threshold (operation 806). In response to the conductor vaporizing, the blade disintegrates (operation 808). In operation 808, the blade may disintegrate by delaminating and/or fragmenting.

Additionally, in response to the trigger detecting the undesired blade event, another trigger for the opposite blade located directly opposite of the blade may close a switch in an electrical circuit corresponding to the opposite blade (operation 810). In response to this switch closing, the electrical circuit is closed and electrical energy is discharged from a capacitor bank in the electrical circuit to a conductor embedded with the opposite blade (operation 812).

The conductor is vaporized in response to the electrical energy flowing through the conductor heating the conductor to a temperature above a selected threshold (operation 814). In response to the conductor vaporizing, the opposite blade disintegrates (operation 816). In operation 816, the blade may disintegrate by delaminating and/or fragmenting. Once operation 808 and operation 816 have been performed, the process terminates.

Of course, in other illustrative examples, the disintegration of the opposite blade in response to the triggering of the disintegration of the blade may be performed in some other manner. For example, pairs of opposing blades in the open rotor engine system may be wired in parallel to the trigger of each blade. In this manner, when the trigger of one blade detects an undesired blade event, the electrical circuits for both blades are closed simultaneously and in parallel.

Figure 9:
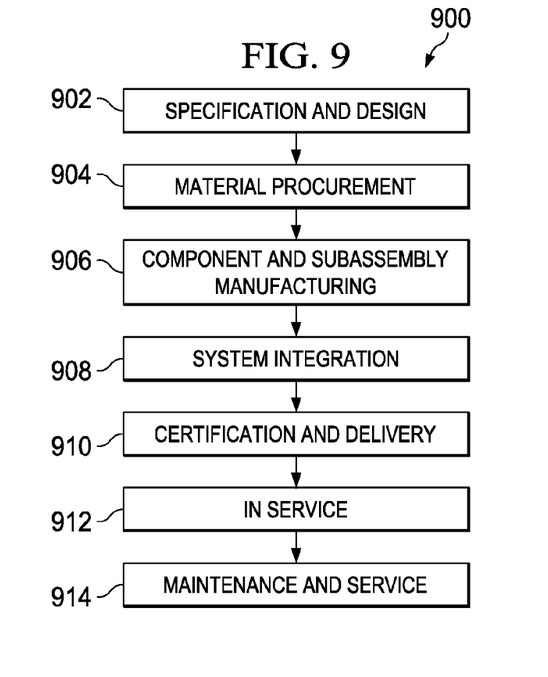
FIG. 9 is an illustration of an aircraft manufacturing and service method in the form of a flowchart in accordance with an illustrative embodiment.
Figure 10:
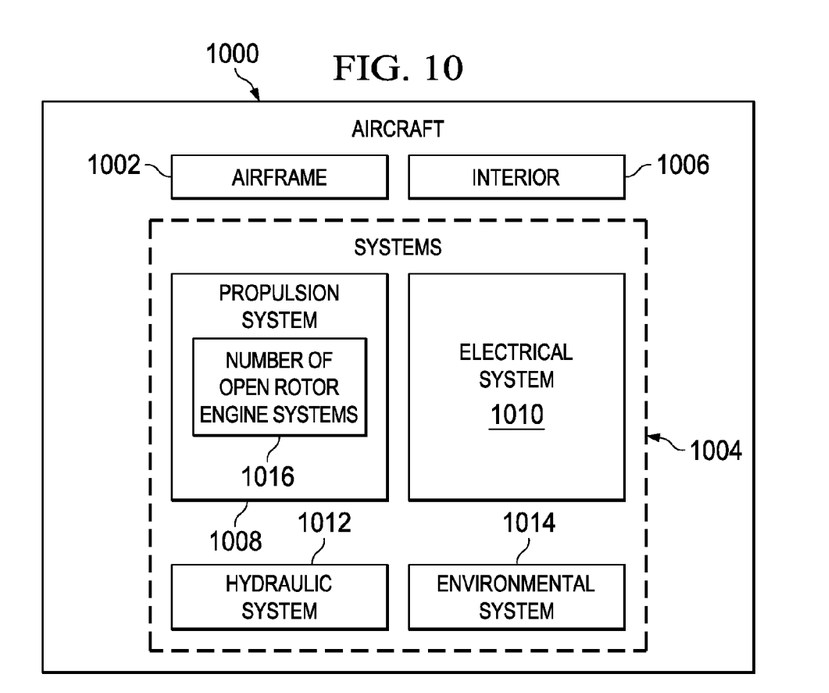
FIG. 10 is an illustration of an aircraft in the form of a block diagram in accordance with an illustrative embodiment.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in the form of a flowchart in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in the form of a block diagram in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. For example, propulsion system 1008 may include number of open rotor engine systems 1016. Each of these open rotor engine systems 1016 may be implemented in manner similar to, for example, open rotor engine system 208 described in FIG. 2. A blade safety mechanism, such as blade safety mechanism 224 in FIG. 2, may be installed during component and subassembly manufacturing 906, system integration 908, routine maintenance and service 914, or some other stage in aircraft manufacturing and service method 900.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912 and/or during maintenance and service 914 in FIG. 9. The use of a number of the different illustrative embodiments may substantially expedite the assembly of and/or reduce the cost of aircraft 1000.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a blade connected to a hub in an open rotor engine system;
    a conductor embedded within the blade and extending a length of an airfoil section of the blade; and
    an activation system configured to allow electrical energy to flow into the conductor in response to an undesired blade event such that the conductor vaporizes.

2. The apparatus of claim 1, wherein the undesired blade event comprises at least one of a separation of the blade from the hub, a bifurcation of the blade along a length of the blade, and a separation of a portion of the blade from a rest of the blade.

3. The apparatus of claim 1, wherein the blade is comprised of a plurality of composite layers and wherein the conductor is embedded between layers of the plurality of composite layers.

4. The apparatus of claim 1, wherein the conductor vaporizing causes the blade to at least one of delaminate or fragment.

5. The apparatus of claim 1, wherein the activation system comprises:
    an electrical circuit, wherein the electrical energy is allowed to flow into the conductor when the electrical circuit is closed.

6. The apparatus of claim 5, wherein the electrical circuit comprises:
    a capacitor bank configured to store the electrical energy that is released into the conductor; and
    a switch configured to close the electrical circuit in response to the undesired blade event such that the electrical energy stored in the capacitor bank is discharged into the conductor.

7. The apparatus of claim 6, wherein the capacitor bank is attached to a rotating portion of the hub.

8. The apparatus of claim 7, wherein the capacitor bank is charged using a number of slip rings connected to a power source located within the open rotor engine system.

9. The apparatus of claim 6, wherein the activation system further comprises:
    a trigger configured to close the switch in response to the undesired blade event.

10. The apparatus of claim 9, wherein the trigger comprises a number of trigger elements.

11. The apparatus of claim 6, wherein the switch is a solenoid switch.

12. The apparatus of claim 6, wherein the switch is a spring-loaded switch comprising:
    a first spring-loaded contact;
    a second spring-loaded contact; and
    an insulator located between the first spring-loaded contact and the second spring-loaded contact, wherein the insulator separates the first spring-loaded contact from the second spring-loaded contact and wherein moving the insulator allows the first spring-loaded contact to contact the second spring-loaded contact and close the electrical circuit.

13. The apparatus of claim 1, wherein the blade is comprised of layers and wherein the conductor is a wire wound around a portion of interior composite layers that form the blade.

14. The apparatus of claim 1, wherein the conductor is comprised of a number of conductive elements connected to each other.

15. An open rotor engine system comprising:
    a hub;
    a plurality of blades in which a blade in the plurality of blades comprises a conductor embedded within the blade and extending a length of an airfoil section of the blade; and
    an activation system configured to allow electrical energy to flow into the conductor in response to an undesired blade event such that the conductor vaporizes and the blade at least one of delaminates or fragments.

16. The open rotor engine system of claim 15, wherein the activation system is further configured to allow the electrical energy to flow into another conductor embedded in an opposite blade located opposite to the blade with respect to a center axis through the hub such that the another conductor vaporizes and the opposite blade at least one of delaminates or fragments.

17. A method comprising:
    detecting an occurrence of an undesired blade event in an open rotor engine system;
    allowing electrical energy to flow into a conductor embedded in a blade and extending a length of an airfoil section of the blade in response to detection of the undesired blade event; and
    vaporizing the conductor when the electrical energy flowing through the conductor heats the conductor to a temperature above a selected threshold.

18. The method of claim 17 further comprising:
disintegrating the blade by at least one of delaminating the blade and fragmenting the blade in response to the conductor vaporizing.

19. The method of claim 17, wherein allowing the electrical energy to flow into the conductor embedded in the blade comprises:
closing an electrical circuit such that the electrical energy stored in a capacitor bank in the electrical circuit is discharged into the conductor.

20. The method of claim 19, wherein closing the electrical circuit such that the electrical energy stored in the capacitor bank in the electrical circuit is discharged into the conductor comprises:
closing a switch in the electrical circuit in response to the undesired blade event, wherein closing the switch closes the electrical circuit.

* * * * *